UNITED STATES PATENT OFFICE.

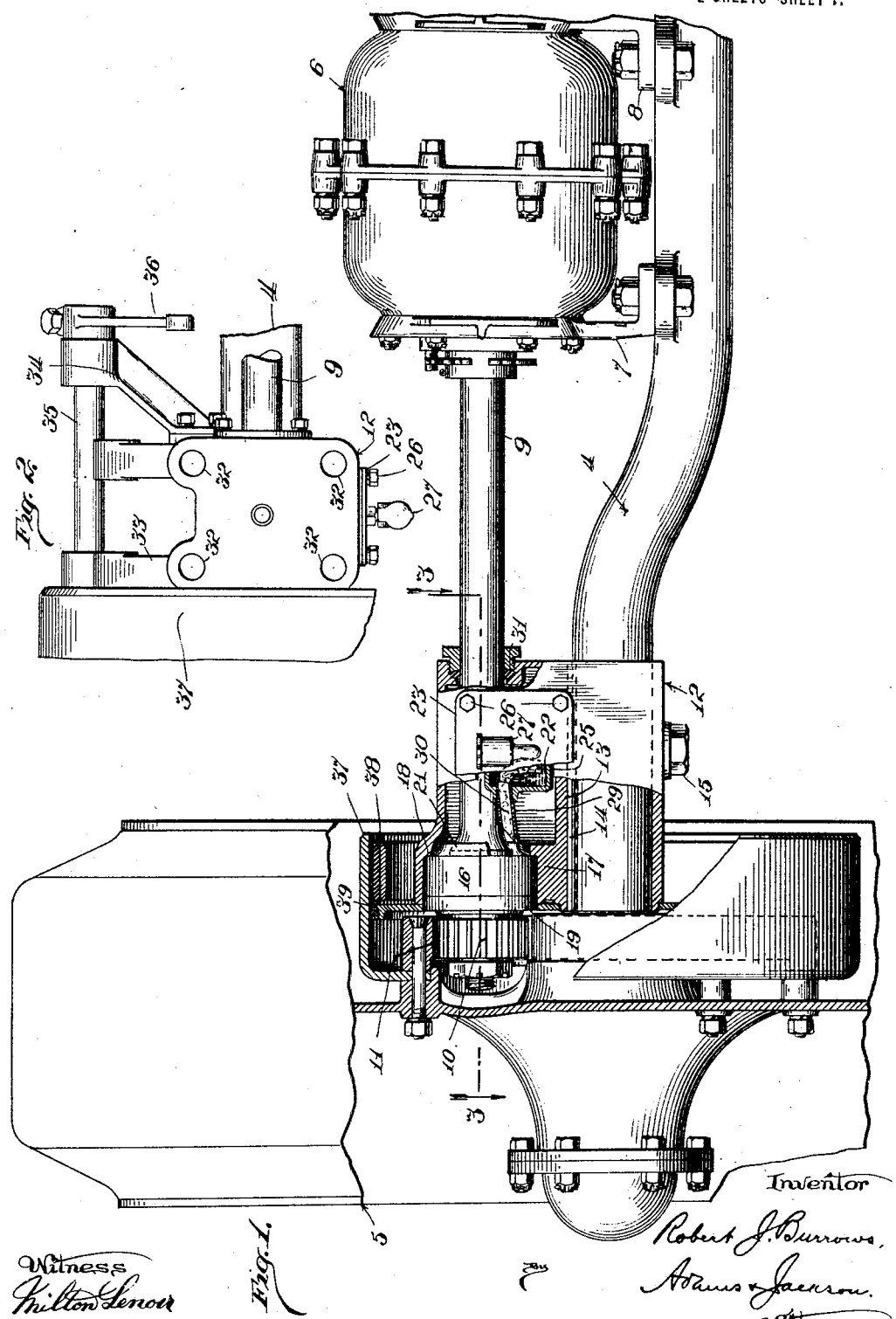

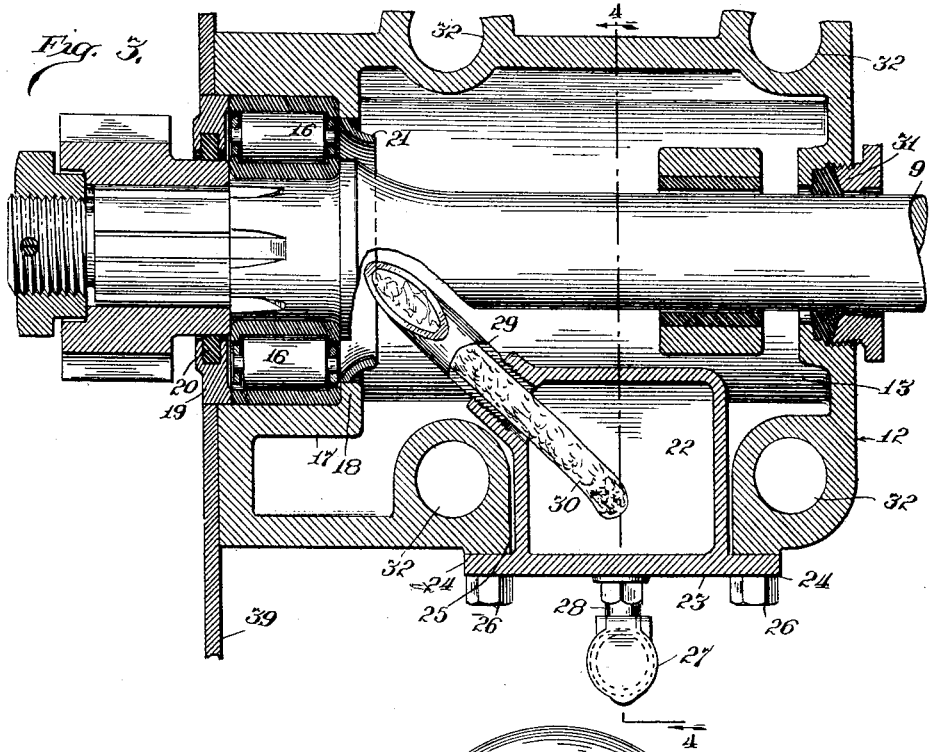
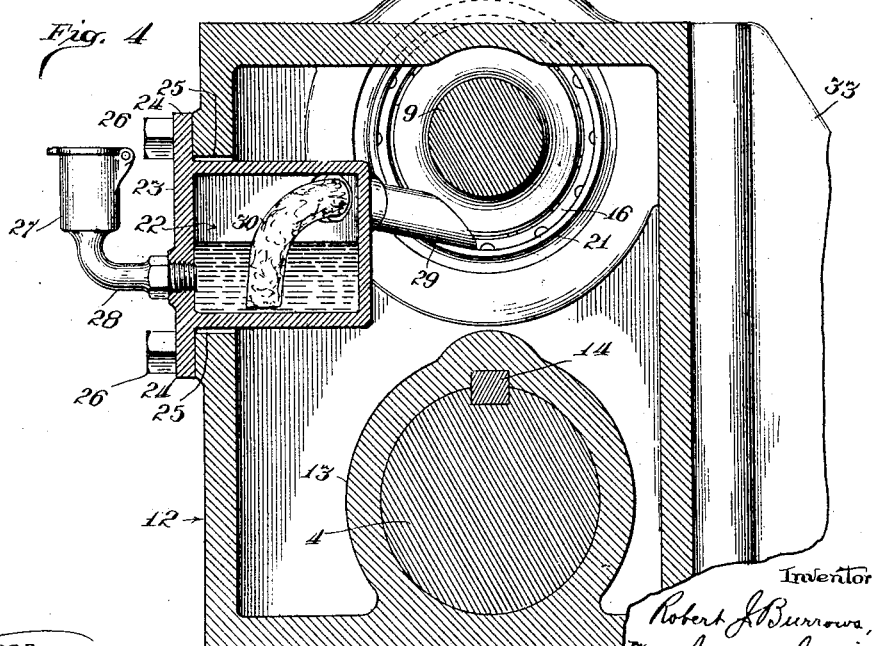

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR VEHICLES.

1,409,664.

Specification of Letters Patent. Patented Mar. 14, 1922.

Application filed July 12, 1919. Serial No. 310,426.

*To all whom it may concern:*

Be it known that I, ROBERT J. BURROWS, a citizen of the United States, and a resident of Buchanan, in the county of Berrien and State of Michigan, have invented certain new and useful Improvements in Axles for Motor Vehicles, of which the following is a specification, reference being had to the accompanying drawings.

My invention relates to motor vehicle axles of the type in which the propelling wheels are mounted upon suitable spindles carried by a dead axle member and are driven through suitable differential gearing by means of jack shafts provided with pinions which mesh with gears, preferably internal gears, carried by the wheels. An axle of this general description is shown and described in Letters Patent No. 1,291,761, granted to me January 21, 1919. My present invention has particularly to do with the provision of means for lubricating the bearings at the outer end portions of the jack shafts whether they are placed at one side of the dead axle member, as shown in the Letters Patent above referred to, or are otherwise disposed with reference to the dead axle member. In the accompanying drawings I have shown my invention embodied in an improved axle structure in which the jack shafts are disposed above and in substantially the same vertical plane as the dead axle member, and this is the construction for which my improved lubricating devices are particularly designed, although the generic features thereof may be applied to axles of other design. The object of my invention is to provide means by which a constant supply of lubricating material, such as oil, may be delivered to the bearings of the outer end portions of the jack shafts, and by which the supply of lubricant may be readily replenished when necessary; also to provide improved means combined therewith for supporting the vehicle springs. I accomplish this object as illustrated in the drawings and as hereinafter described. What I regard as new is set forth in the claims.

In the accompanying drawings—

Fig. 1 is a rear elevation of somewhat more than half of a rear axle, part of the wheel being broken away, and some parts being in section;

Fig. 2 is a fragmentary plan view of one outer end portion of the axle;

Fig. 3 is an enlarged horizontal section on line 3—3 of Fig. 1; and

Fig. 4 is a vertical cross-section on line 4—4 of Fig. 3.

Referring to the drawings, – 4 indicates the dead axle member which is provided with the usual wheel spindles adapted to support wheels 5. 6 indicates a differential housing which is mounted upon the central portion of the dead axle member 4 and is secured thereto by brackets 7–8 bolted or otherwise suitably secured to the dead axle member. 9 indicates one of two jack shafts, the inner ends of which extend into the differential housing 6 and are geared to the differential gearing in any suitable way. It will be undertsood that the parts shown in Fig. 1 at one side of the differential housing are duplicated at the other side thereof, and the description will therefore be confined to the parts shown. 10 indicates a spur pinion mounted on the outer end of the jack shaft 9 and adapted to mesh with an internal gear 11 carried by the wheel 5. Thus rotation of the jack shaft 9 drives the wheel. 12 indicates a box-like housing, the lower portion of which is provided with an integral sleeve 13 which fits upon the outer end portion of the dead axle member 4 inside the spindle thereof, and is non-rotatably secured thereupon by means of a key 14, shown in Fig. 4. Endwise movement of the sleeve 13 upon the dead axle member is prevented by means of a set screw 15 which passes therethrough into engagement with the dead axle member, as shown in Fig. 1. The outer end portion of the jack shaft 9 extends through the upper portion of the housing 12, and is provided adjacent to the pinion 10 with an anti-friction bearing 16 fitted in a suitable recess provided for that purpose in the housing 12, as shown in Fig. 3. Preferably the anti-friction bearing 16 is a roller bearing, as shown in said figure. The recess which receives the bearing 16 is formed by an internally-projecting annular frame 17, shown in Figs. 3 and 4, having an inwardly-projecting lip 18 at its inner margin to form an abutment against which the inner end of the bearing 16 fits, as best shown in Fig. 3. The outer end of the pocket or recess which receives said bearing is closed around the hub of the pinion 10 by a disc 19 carrying a felt or other suitable washer 20 which bears upon the hub of said pinion, as shown. The purpose of the disc 19 and washer 20 is to exclude dust and dirt from the bearing 16. 21 indicates a conical or flaring collar which is fitted tightly in the annular opening formed by the lip 18 and loosely encircles the jack shaft 9, forming a sort of funnel to direct lubricant to the bearing 16 and the pocket in which it is mounted.

22 indicates an oil reservoir having a face plate 23 provided with a marginal flange 24. Said reservoir is adapted to be inserted into the chamber within the housing 12 through an opening 25 at one side thereof, as shown in Figs. 3 and 4, and to be secured in position by bolts 26 passing through the flange 24 into the wall of the housing 12. The reservoir 22 is adapted to be supplied with oil or other lubricant from an external oil cup 27 having a duct 28 which leads to said reservoir, as shown in Fig. 4. 29 indicates a tube which leads from the upper portion of the reservoir 22 to the collar 21, over the margin of which it extends slightly, as shown in Fig. 3. The tube 29 contains a wick 30, the inner end of which dips into the oil in the reservoir 22.

By the construction described, it will be apparent that oil taken up by the wick 30 will pass through the tube 29 and be discharged within the collar 21, whence it will pass down into the recess or pocket containing the anti-friction bearing 16, and will also pass into said bearing, so that the bearing will be well lubricated as long as a supply of oil is maintained in the reservoir 22. The washer 20, in addition to excluding dust from said bearing, also prevents the free passage of oil out of said bearing, and thereby prevents waste of the lubricant. The reservoir 22, with the tube 29 and wick 30, may readily be removed when desired by simply unscrewing the bolts 26. To prevent dust and dirt from entering the chamber within the housing 12, a stuffing-box 31 is provided around the jack shaft 9 at the end of said housing opposite that at which the bearing 16 is mounted, as shown in Figs. 1 and 3. In the construction shown in the drawings, the housing 12 may also serve as a spring seat to support the usual springs, and it may also be employed to support the rock-shaft by which the usual internal brakes are operated. As shown in Fig. 2, said housing is provided with a series of vertically-arranged bolt holes 32 for the reception of the bolts or clips usually employed to secure the springs in place, and at the side opposite the oil cup 27 it is provided with laterally-extending lugs or brackets 33—34 having bearings in which is mounted a brake-operating rock-shaft 35. 36 indicates the lever by which the rock-shaft 35 is operated. 37 indicates a brake drum which is secured to the wheel 5 and extends over the internal gear 11 and also over the adjoining end portion of the housing 12. 38 indicates an internal brake which cooperates with the brake drum 37, and is actuated by the rocking of the rock-shaft 35 in any suitable way, as by means of a cam carried by said rock-shaft, as shown in the Letters Patent hereinbefore referred to. 39 indicates a vertically-disposed disc or partition which divides the space within the brake drum 37 into two chambers, one of which contains the internal gear 10 and the other the brake 38, as described in my said patent.

The construction described provides a convenient and reliable arrangement by which adequate lubrication of the outer bearing of the jack shaft is maintained, and at the same time provides means by which the torque strains are transmitted to the dead axle member and to the springs.

What I claim as my invention and desire to secure by Letters Patent, is—

1. The combination with a dead axle and a wheel spindle carried thereby, of a jack shaft, a housing mounted on said dead axle and having a bearing for said jack shaft, an oil reservoir enclosed in said housing, and means for conducting oil from said reservoir to said bearing.

2. The combination with a dead axle and a wheel spindle carried thereby, of a housing mounted on said axle adjacent to said wheel spindle, a jack shaft extending through said housing and having a bearing therein, an oil reservoir in said housing, and means for conducting oil from said reservoir to said bearing.

3. The combination with a dead axle and a wheel spindle carried thereby, of a jack shaft, a housing mounted on said dead axle and having a bearing for said jack shaft, an oil reservoir in said housing, and a wick for conducting oil from said reservoir to said bearing.

4. The combination with a dead axle and a wheel spindle carried thereby, of a jack shaft, a housing mounted on said dead axle and having a bearing for said jack shaft, an oil reservoir in said housing, a wick for conducting oil from said reservoir to said bearing, and a tube connected with said reservoir and enclosing said wick.

5. The combination with a dead axle and a wheel spindle carried thereby, of a jack shaft, a housing mounted on said dead axle and having a bearing for said jack shaft, an oil reservoir fitted in and detachably connected with said housing, and means for conducting oil from said reservoir to said bearing.

6. The combination with a dead axle and a wheel spindle carried thereby, of a jack shaft, a housing mounted on said dead axle and having a bearing for said jack shaft, an oil reservoir fitted in and detachably connected with said housing, a tube connected with said reservoir, and a wick in said tube for conducting oil from said reservoir to said bearing.

7. The combination with a dead axle and a wheel spindle carried thereby, of a housing mounted on said axle adjacent to said wheel spindle, a jack shaft extending through said housing and having a bearing therein, an oil reservoir in said housing, means for conducting oil from said reservoir to said bearing, and a stuffing-box carried by said housing around said jack shaft.

8. The combination with a dead axle and a wheel spindle carried thereby, of a housing mounted on said axle adjacent to said wheel spindle, a jack shaft extending through said housing and having a bearing therein, an oil reservoir in said housing, means for conducting oil from said reservoir to said bearing, a stuffing-box carried by said housing around said jack shaft, and dust-excluding means around said jack shaft at the opposite end of said housing from said stuffing-box.

9. The combination with a dead axle and a wheel spindle carried thereby, of a jack shaft, a housing non-rotatably mounted on said jack shaft adjacent to said wheel spindle and having a bearing for said jack shaft, an oil reservoir in said housing, and means for conducting oil from said reservoir to said bearing, said housing being arranged to form a spring seat.

10. The combination with a dead axle and a wheel spindle carried thereby, of a jack shaft, a housing non-rotatably mounted on said jack shaft adjacent to said wheel spindle and having a bearing for said jack shaft, an oil reservoir in said housing, means for conducting oil from said reservoir to said bearing, and a brake-operating rock-shaft supported by said housing.

11. The combination with a dead axle and a wheel spindle carried thereby, of a jack shaft, a housing non-rotatably mounted on said jack shaft adjacent to said wheel spindle and having a bearing for said jack shaft, an oil reservoir in said housing, means for conducting oil from said reservoir to said bearing, and a brake-operating rock-shaft supported by said housing, said housing being arranged to form a spring seat.

12. The combination with a dead axle and a wheel spindle carried thereby, of a differential housing mounted upon the central portion of said dead axle, a housing non-rotatably mounted on said dead axle adjacent to said wheel spindle, a jack shaft extending into said differential housing and through said non-rotatable housing and having a bearing in the latter, an oil reservoir in the latter housing, and means for conducting oil from said reservoir to said bearing.

13. The combination with a dead axle and a wheel spindle carried thereby, of a differential housing mounted upon the central portion of said dead axle, a housing non-rotatably mounted on said dead axle adjacent to said wheel spindle, a jack shaft extending longitudinally over said dead axle into said differential housing and through said non-rotatable housing and having a bearing in the latter, an oil reservoir in the latter housing, and means for conducting oil from said reservoir to said bearing.

ROBERT J. BURROWS.